(12) United States Patent
Fang et al.

(10) Patent No.: US 7,955,490 B2
(45) Date of Patent: Jun. 7, 2011

(54) PROCESS FOR PREPARING SODIUM HYDROXIDE, CHLORINE AND HYDROGEN FROM AQUEOUS SALT SOLUTION USING SOLAR ENERGY

(76) Inventors: James Fang, Philadelphia, PA (US);
John Fang, Nashville, TN (US)

( * ) Notice: Subject to any disclaimer, the term of this patent is extended or adjusted under 35 U.S.C. 154(b) by 352 days.

(21) Appl. No.: 12/256,904

(22) Filed: Oct. 23, 2008

(65) Prior Publication Data

US 2009/0107850 A1    Apr. 30, 2009

Related U.S. Application Data

(60) Provisional application No. 61/000,323, filed on Oct. 24, 2007.

(51) Int. Cl.
*C25B 1/34* (2006.01)
*C25B 1/46* (2006.01)
*C25B 1/18* (2006.01)
*C25B 1/20* (2006.01)

(52) U.S. Cl. ........ 205/500; 205/510; 205/620; 205/340; 204/230.2; 204/232; 204/266; 204/252; 204/263; 136/244; 136/246; 136/248

(58) Field of Classification Search ............... 204/230.2, 204/232, 266, 252, 263; 205/500, 510, 512, 205/620, 687, 340, 628; 136/244, 246, 248
See application file for complete search history.

(56) References Cited

U.S. PATENT DOCUMENTS

| | | | | |
|---|---|---|---|---|
| 4,434,041 | A | * | 2/1984 | Kelly et al. ............... 204/296 |
| 4,481,088 | A | * | 11/1984 | Moore et al. ............. 205/536 |
| 5,186,794 | A | | 2/1993 | Parker et al. |
| 6,296,745 | B1 | * | 10/2001 | DuBois et al. ............ 204/266 |
| 6,719,891 | B2 | * | 4/2004 | Ruhr et al. ............... 205/500 |
| 7,510,640 | B2 | * | 3/2009 | Gibson et al. ............ 205/628 |
| 2005/0092618 | A1 | | 5/2005 | Venkatesan et al. |
| 2005/0183962 | A1 | * | 8/2005 | Oakes ..................... 205/340 |
| 2007/0045105 | A1 | * | 3/2007 | Schussler et al. ........ 204/230.2 |
| 2007/0277870 | A1 | * | 12/2007 | Wechsler .................. 136/248 |

* cited by examiner

*Primary Examiner* — Bruce F Bell
(74) *Attorney, Agent, or Firm* — Potter Anderson Corroon LLP; Hilmar L. Fricke

(57) ABSTRACT

A process for the production of sodium hydroxide, hydrogen gas and chlorine gas which comprises
(1) forming an aqueous solution of sodium chloride,
(2) placing the sodium chloride solution in a cell having two compartments separated by a separator,
(3) subjecting the cell to a direct electrical current of about 3-24 volts and 0.1-500 K amperes; thereby generating hydrogen gas, chlorine gas and an aqueous sodium hydroxide solution and wherein the electrical current is generated by a solar panel.

7 Claims, 1 Drawing Sheet

PROCESS FOR PREPARING SODIUM HYDROXIDE, CHLORINE AND HYDROGEN FROM AQUEOUS SALT SOLUTION USING SOLAR ENERGY

CROSS REFERENCE TO RELATED APPLICATIONS

This application claims the benefit of U.S. Provisional Application Ser. No. 61/000,323 filed on Oct. 24, 2007 which is hereby incorporated by reference.

FIELD OF THE INVENTION

The present invention relates to a process for the preparation of sodium hydroxide, chlorine and hydrogen gases from an aqueous sodium chloride solution using electrical solar energy.

BACKGROUND OF THE INVENTION

Parker et al. U.S. Pat. No. 5,186,794 shows a complex apparatus for the production of alkali metal hydroxides, hydrogen and halogen gases using an electrical powered electrolysis cell and solar energy to power a photolysis cell used in the process. Venkatesan et al. U.S. 2005/0092618 discloses a process and apparatus for removing chloride and sodium ions from an aqueous sodium chloride solution using a cell powered by electrical energy.

There is a need for a practical and economical process for the conversion of an aqueous sodium chloride solution into sodium hydroxide, chlorine and hydrogen gases that utilizes electrical solar energy power.

SUMMARY OF THE INVENTION

A process for the production of sodium hydroxide, hydrogen gas and chlorine gas which comprises (1) forming an aqueous solution of sodium chloride, (2) placing the sodium chloride solution in a cell having two compartments separated by a separator selected from the group of (a) a fluorocarbon polymer membrane, (b) a glass fiber magnesium hydroxide or magnesium oxide membrane, (c) an asbestos paper, (d) a combination of membranes (a) and (b) or (e) a combination of membrane (a) and asbestos paper (c).

(3) subjecting the cell to a direct electrical current of about 3-24 volts and 0.1-500 K amperes; thereby generating hydrogen gas, chlorine gas and an aqueous sodium hydroxide solution and wherein the electrical current is generated by a solar panel.

DETAILED DESCRIPTION OF THE INVENTION

Figure 1:
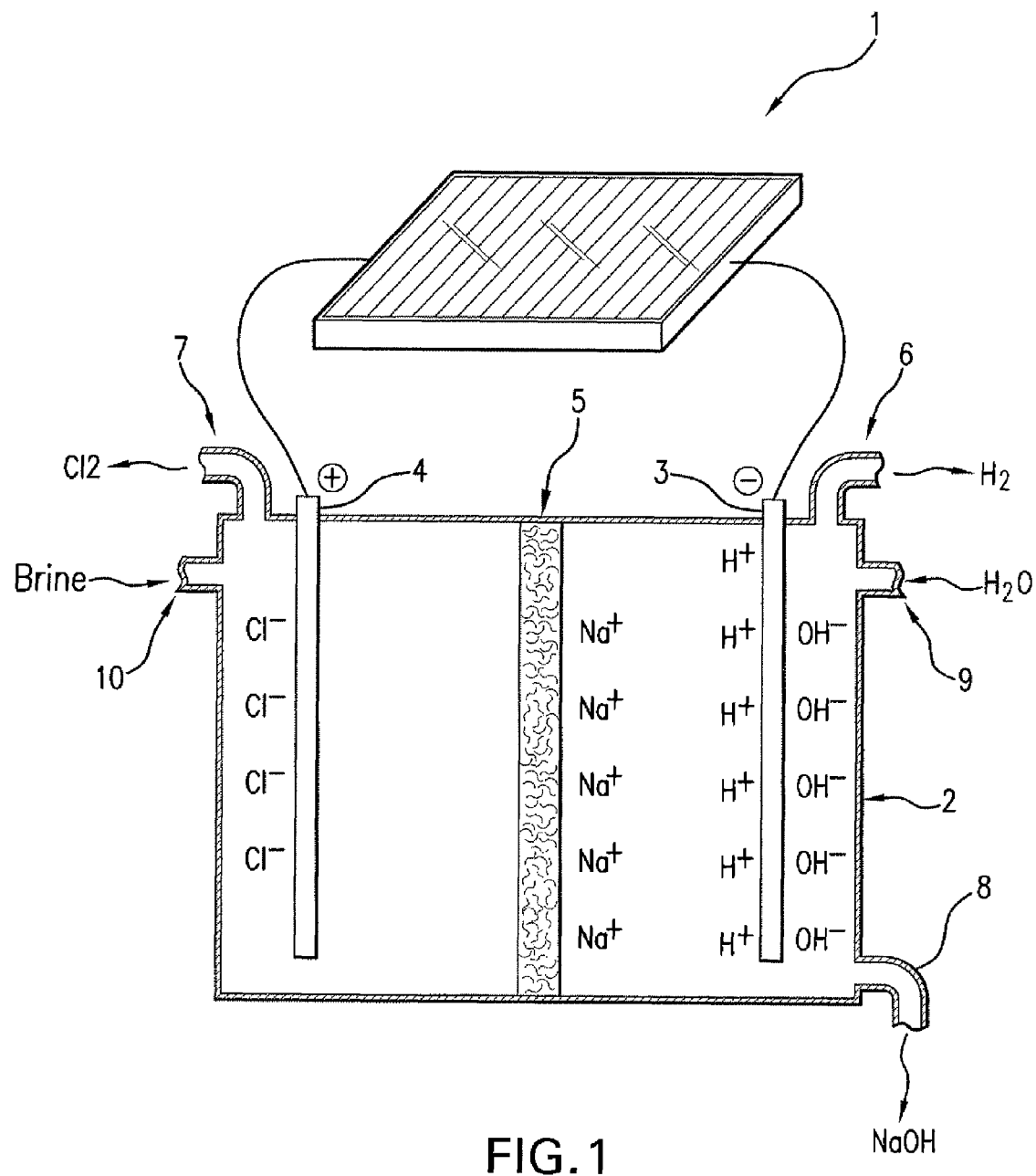
FIG. 1 illustrates an electrolysis cell electrically connected to a solar panel supplying electrical energy to the cell.

This invention is directed to a simple and economical method of electrolyzing an aqueous sodium chloride solution to form sodium hydroxide, chlorine gas and hydrogen gas utilizing electrically power from a solar panel. The advantage of this invention is that small scale relatively low cost equipment can be used and electrical energy is provided by a solar panel which makes the process economical an profitable for very small or large scale operations.

FIG. 1 illustrates a typical process for the electrolysis of an aqueous sodium chloride solution wherein an electrolysis cell 2 is electrically attached to a solar panel 1 that provides the electrical energy to the electrolysis cell 2. The solar panel 2 is electrically connected to the cathode 3 and the anode 4 of the cell. A separator 5 is positioned in the middle of the cell 2 creating two compartments in the cell. A brine (aqueous NaCl solution) inlet 10 is located near the anode 4. Hydrogen ions ($H^+$) that form the hydrogen gas ($H_2$) and sodium ions ($Na^+$) collected near the negatively charged cathode 3 and chlorine ions ($Cl^-$) that form the chlorine gas ($Cl_2$) are collected next to the positively charged anode 4 of the cell. Outlet 6 provides for the removal of the hydrogen gas that is generated and outlet 7 provides for the removal of chlorine gas generated by the cell. Upon completion of electrolysis of the aqueous salt solution, an aqueous sodium hydroxide solution is formed and is removed through outlet 8 of the cell.

Water can be added to the cell through inlet 9 to adjust the concentration of the sodium hydroxide solution to the desired level.

Typically, the hydrogen gas generated can be collected and compressed and stored in cylinders or tanks or it can be run to heating device and used as fuel for the device. Similarly, the chlorine gas can be collected and compressed and stored or it can be piped to a reactor and used in a reaction to form other products, for example, the chlorine gas can be reacted with the sodium hydroxide that is generated to form sodium hypochlorite which has many uses, for example, in disinfectants or as a bleach.

Hydrogen, chlorine and sodium hydroxide are major industrial materials. For example, hydrogen and nitrogen react in the presence of a platinum catalyst to form ammonia, hydrogen and vegetable or animal fat react to form stearic acid or palmitic acid which can be further reacted with sodium hydroxide to make house hold soap. Chlorine which is a major raw material can be used for making vinyl chloride and chlorinated solvents.

The solar panel 1 must be capable of generating a direct current of 3-24 volts and 0.1 to 500 K amperes. Preferably, the solar cell is operated at 3-12 volts and 1-100 K amperes. The output of the solar panel is dependent upon the size of the panel, the intensity of the sun and the length of time the panel is exposed to the sun. Typically useful solar panels that can be used in the process of this invention are panels made from crystalline silicon, amorphous silicon, cadmium telluride or copper-indium-gallium selenides. Typical of such solar panels are GE Kyocera Solar Cell and Evergreen Solar Cell.

The electrolysis cell 2 typically is of a non-conductive material, such as, glass or a ceramic or metal coated with a non-conductive material, such as, a polymer or a ceramic. The size of the cell can vary from small, e.g. 1 liter to large, e.g., 100 liters or more depending on the extent of the operation. The cell is divided into two compartments with a separator 5. Preferred is a separator of a fluorocarbon polymer membrane which preferably is a Nafion® membrane which is formed from a sulfonated tetrafluorethylene. Another separator that can be used is a glass fiber separator containing magnesium hydroxide or magnesium oxide. The magnesium oxide or hydroxide can be impregnated into a layer of glass fibers or a layer of the oxide or hydroxide can be applied over a layer of the glass fibers. Asbestos paper is also useful as separator. One preferred separator is a membrane that is the combination of the fluorocarbon polymer membrane and the glass fiber magnesium hydroxide or oxide membrane. Another useful membrane is a combination of the fluorocarbon polymer membrane and asbestos paper. Typically, the membrane has a thickness of about 2 to 15 mils.

The electrolysis cell 2 contains a cathode 3 and an anode 4. Typically the cathode and anode are of a conductive material, such as, graphite, titanium metal or titanium metal coated with ruthenium oxide.

In the operation of the process of this invention, an aqueous sodium chloride solution is prepared typically containing 3-60% by weight sodium chloride and preferably, 30-50% by weight sodium chloride. The temperature of the sodium chloride solution is about 5-100° C. and preferably at 10-60° C. Upon subjecting the aqueous sodium chloride solution to a DC current, hydrogen and sodium ions migrate to the cathode and chloride an hydroxyl ions migrate to the anode. Hydrogen gas is formed at the cathode and collected and chlorine gas is formed at the anode and collected. Upon completion of hydrolysis of the sodium chloride solution, a sodium hydroxide solution is formed and removed from the cell.

The following reaction takes place in the cell:

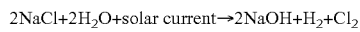

$$2NaCl + 2H_2O + solar\ current \rightarrow 2NaOH + H_2 + Cl_2$$

The advantages of the process of this invention are that it is operated without conventional electrical power since solar energy provides the power requirements. It can be a very compact process that fits into a small area or can be scaled to the size needed. The process can be a very low cost and small operation or can be readily scaled up to a substantially larger size.

The following example illustrates the invention. All parts and percentages are on a weight basis unless otherwise indicated.

EXAMPLE 1

A small diaphragm electrolytic cell with a 10 mil thick asbestos paper separator equipped with a titanium metal rod cathode, a brine inlet, a chlorine gas outlet in the anode chamber and a graphite cathode, a hydrogen outlet, a sodium hydroxide outlet and a water inlet in the cathode chamber was used. A GE Kyocera Solar Cell was used and connected to the cathode and anode of the electrolytic cell. Electrolysis was started at sunrise and ended at sunset. The voltage and amperage varied from about 0.1 to 6 volts and the amperage from about 0.1 to 10 amperes.

The chlorine gas generated was piped to a sodium hydroxide solution taken from the cathode chamber of the electrolytic cell which was diluted with water to 4-6% NaOH and 1-2% NaCl to form a sodium hypochlorite solution and the hydrogen gas generated was fed to a burner and used a fuel for the burner.

EXAMPLE 2

A small electrolytic cell was used having a separator of Nafion® fluoropolymer/glass fiber magnesium oxide about 2 mils thick and was equipped as in Example 1. The glass fiber magnesium oxide layer of the separator faced the anode section of the cell and the Nafion® fluoropolymer layer of the separator faced the cathode section of the cell. The cell was operated from sunrise to sunset with similar variations in voltage and amperage. Chlorine gas and hydrogen gas were both generated.

What is claimed is:

1. A process for the production of sodium hydroxide, hydrogen gas and chlorine gas which comprises
   (1) forming an aqueous solution of sodium chloride,
   (2) placing the sodium chloride solution in a cell having an anode compartment and a cathode compartment, wherein the two compartments being separated by a separator consisting of a sulfonated fluoropolymer layer and glass fiber magnesium oxide layer, wherein the glass fiber magnesium oxide layer faces the anode compartment and the sulfonated fluoropolymer layer faces the cathode compartment;
   (3) subjecting the cell to a direct electrical current of about 3-24 volts and 0.1-500 K amperes; thereby generating hydrogen gas, chlorine gas and an aqueous sodium hydroxide solution and wherein the electrical current is generated by a solar panel.

2. The process of claim 1 wherein the aqueous sodium chloride solution contains 30 to 50% by weight sodium chloride and is at a temperature of about 5-100° C. and the direct electrical current is 3-12 volts and 1-100 K amperes.

3. The process of claim 1 wherein the solar panel comprises a panel selected from the group consisting of crystalline silicon, amorphous silicon, cadium telluride or copper-indium-gallium selenides.

4. The process of claim 1 wherein the chlorine gas and the hydrogen gas generated are compressed and stored in separate cylinders.

5. A process for the production of sodium hydroxide, hydrogen gas, chlorine gas and sodium hypochlorite which comprises
   (1) forming an aqueous solution of sodium chloride,
   (2) placing the sodium chloride solution in a cell having an anode compartment and a cathode compartment, wherein the two compartments being separated by a separator consisting of a sulfonated fluoropolymer layer and glass fiber magnesium oxide layer, wherein the glass fiber magnesium oxide layer faces the anode compartment and the sulfonated fluoropolymer layer faces the cathode compartment;
   (3) subjecting the cell to a direct electrical current of about 3-24 volts and 0.1-500 K amperes; thereby generating hydrogen gas, chlorine gas and an aqueous sodium hydroxide solution and wherein the electrical current is generated by a solar panel and further comprises
   (4) reacting the chlorine gas generated with sodium hydroxide to form sodium hypochlorite.

6. The process of claim 5 wherein the aqueous sodium chloride solution contains 30 to 50% by weight sodium chloride and is at a temperature of about 5-100° C. and the direct electrical current is 3-12 volts and 1-100 K amperes.

7. The process of claim 5 wherein the solar panel comprises a panel selected from the group consisting of crystalline silicon, amorphous silicon, cadium telluride or copper-indium-gallium selenides.

* * * * *